US005567235A

United States Patent [19]

Carson et al.

[11] Patent Number: 5,567,235

[45] Date of Patent: Oct. 22, 1996

[54] METHOD FOR STRENGTHENING A BRITTLE OXIDE SUBSTRATE, SILANE-BASED COMPOSITIONS, AND A POLYMERIZED CROSS-LINKED SILOXANE COATED BRITTLE OXIDE SUBSTRATE

[75] Inventors: Stephen W. Carson, Downingtown; Ryan R. Dirkx, Glenmoore; Victor D. Papanu, Doylestown, all of Pa.; Neal D. Conrad, Trenton, N.J.

[73] Assignee: Elf Atochem North America, Inc., Philadelphia, Pa.

[21] Appl. No.: 468,663

[22] Filed: Jun. 6, 1995

Related U.S. Application Data

[60] Division of Ser. No. 344,621, Nov. 17, 1994, and a continuation-in-part of Ser. No. 986,894, Dec. 8, 1992, abandoned, which is a continuation of Ser. No. 738,030, Jul. 30, 1991, abandoned, which is a division of Ser. No. 575,052, Aug. 30, 1990, abandoned, said Ser. No. 344,621, is a continuation of Ser. No. 78,811, Jun. 21, 1993, abandoned, which is a continuation-in-part of Ser. No. 43,980, Apr. 7, 1993, abandoned, which is a continuation of Ser. No. 873,315, Apr. 24, 1992, abandoned, which is a continuation-in-part of Ser. No. 575,052, Aug. 30, 1990, abandoned.

[51] Int. Cl.$^6$ .......................... C04B 41/49; C03C 17/30
[52] U.S. Cl. ................... 106/287.16; 106/287.13; 106/287.14; 106/287.15; 556/444
[58] Field of Search .................. 106/287.13, 287.14, 106/287.15, 287.16; 556/444

[56] References Cited

U.S. PATENT DOCUMENTS

| | | |
|---|---|---|
| 2,834,693 | 5/1958 | Kenmore . |
| 3,244,664 | 4/1966 | Zelinski et al. . |
| 3,310,417 | 3/1967 | Lerner et al. . |
| 3,364,246 | 1/1968 | Rossmy . |
| 3,460,980 | 8/1969 | Burzynski . |
| 3,662,022 | 5/1972 | Lard . |
| 3,743,491 | 7/1973 | Poole et al. . |
| 3,787,303 | 1/1974 | Guthrie et al. . |
| 3,801,361 | 4/1974 | Kitaj . |
| 3,816,152 | 6/1974 | Yates . |
| 3,864,229 | 2/1975 | Zapp et al. . |
| 3,873,352 | 3/1975 | Kitaj . |
| 3,922,436 | 11/1975 | Bell et al. . |
| 4,049,861 | 9/1977 | Nozari . |
| 4,084,021 | 4/1978 | Sandvig . |
| 4,120,923 | 10/1978 | Kloker et al. . |
| 4,125,644 | 11/1978 | Ketley et al. . |
| 4,130,690 | 12/1978 | Lien et al. . |
| 4,161,500 | 7/1979 | Schleinitz et al. . |
| 4,167,465 | 9/1979 | Zussman et al. . |
| 4,215,165 | 7/1980 | Gras et al. . |
| 4,229,228 | 10/1980 | Rotenberg et al. . |
| 4,264,658 | 4/1981 | Tobias et al. . |
| 4,287,227 | 9/1981 | Kamada et al. . |
| 4,289,816 | 9/1981 | Fegelberg et al. . |
| 4,304,802 | 12/1981 | Mosse et al. . |
| 4,371,566 | 2/1983 | Russell . |
| 4,374,879 | 2/1983 | Roberts et al. . |
| 4,431,472 | 2/1984 | Hohl et al. . |
| 4,467,068 | 8/1984 | Manuyama et al. . |
| 4,485,130 | 11/1984 | Lampin et al. . |
| 4,511,209 | 4/1985 | Skutnik . |
| 4,514,037 | 4/1985 | Bishop et al. . |
| 4,572,610 | 2/1986 | Krajewski . |
| 4,575,437 | 3/1986 | Kojima et al. . |
| 4,585,306 | 4/1986 | Ohmori et al. . |
| 4,645,297 | 2/1987 | Yoshihara et al. . |
| 4,648,904 | 3/1987 | DePasquale et al. . |
| 4,660,927 | 4/1987 | Kondow et al. . |
| 4,671,990 | 6/1987 | Jada et al. . |
| 4,707,076 | 11/1987 | Skutnik et al. . |
| 4,749,614 | 6/1988 | Andrews et al. . |
| 4,859,636 | 8/1989 | Aratani et al. . |
| 4,872,896 | 10/1989 | LaCourse et al. . |
| 4,891,241 | 1/1990 | Hashimoto et al. . |
| 4,961,976 | 10/1990 | Hashimoto et al. . |
| 4,985,286 | 1/1991 | Kurita et al. . |
| 5,013,788 | 5/1991 | Nagashima et al. . |
| 5,034,061 | 7/1991 | Maguire et al. . |
| 5,091,468 | 2/1992 | Takeuchi . |
| 5,112,658 | 5/1992 | Skutnik et al. . |

FOREIGN PATENT DOCUMENTS

| | | |
|---|---|---|
| 223778 | 5/1958 | Australia . |
| 0478152 | 4/1992 | European Pat. Off. . |
| 59-121138 | 7/1984 | Japan . |

OTHER PUBLICATIONS

CA116:261049, Carson et al, Apr. 1992.
CA 118:255974, Toray Industries, Inc., Jul. 1992.
CA 120:198714, Jones, Nov. 1993.
CA 109:232885, Hanaoka et al, Jul. 1988.
CA 102:8331, Suwaq Seikosha Co., Jun. 1984.
"Chemical Methods for Making Thin Transparent Films," Publishing House Chemistry, Leningrad, (1971), pp. 48–55, with translation.
Masters Thesis, Alfred University, New York, "Glass Strenthening Via Silane Coupling–Agent Coatings" R. Bennett, (Feb., 1989).

*Primary Examiner*—David Brunsman
*Attorney, Agent, or Firm*—Finnegan, Henderson, Farabow, Garrett & Dunner, L.L.P.

[57] ABSTRACT

A method is described for strengthening or restoring strength to a brittle oxide substrate which includes the steps of coating the brittle oxide substrate with an aqueous solution containing a silane-based composition, and curing the coating to form a transparent layer on the brittle oxide substrate. Also disclosed are novel compositions used to coat brittle oxide substrates, and silane-coated brittle oxide containers.

13 Claims, No Drawings

METHOD FOR STRENGTHENING A BRITTLE OXIDE SUBSTRATE, SILANE-BASED COMPOSITIONS, AND A POLYMERIZED CROSS-LINKED SILOXANE COATED BRITTLE OXIDE SUBSTRATE

This application is a division of application Ser. No. 08/344,621, filed Nov. 17, 1994, pending; which is a continuation of application Ser. No. 08/078,811, filed Jun. 21, 1993, abandoned; which is a continuation-in-part of application Ser. No. 08/043,980, filed Apr. 7, 1993, abandoned; which is a continuation of application Ser. No. 07/873,315, filed Apr. 24, 1992, abandoned; which is a continuation-in-part of application serial No. 07/575,052, filed Aug. 30, 1990, abandoned. This application is also a continuation-in-part of U.S. Ser. No. 07/986,894, filed Dec. 8, 1992, abandoned; which is a continuation application serial No. 07/738,030, filed Jul. 30, 1991, abandoned; which was a division of application serial No. 07/575,052, filed Aug. 30, 1990, abandoned, the contents of which are relied upon and incorporated herein by reference.

BACKGROUND OF THE INVENTION

The present invention relates to a method of strengthening a brittle oxide substrate and also relates to aqueous solutions containing silane-based compositions and polymerized cross-linked siloxane coated brittle oxide substrates. More particularly, the present invention relates to a method of strengthening or restoring strength to a glass container and the resulting polymerized cross-linked siloxane coated glass container.

Brittle materials, such as glass substrates, generally exhibit some mechanical properties, such as, e.g., tensile strength, which are substantially lower than predicted. This manifestation can arise as the result of such factors as imperfections in the structure of a test specimen, or small amounts of impurities in either the body or the surface of an article made of that material. Progressive zone melting to reform the crystalline structure and floating impurities out of the melted brittle material have been used in the past for brittle metals in an attempt to improve the mechanical properties of the brittle metals. Also, with regard to non-metal brittle materials, multi-layer structures made of the brittle material have been used to improve mechanical properties. In addition, surface treatments of the brittle material have been used to protect the surface from abrasion and to provide a small measure of support to brittle articles.

Glass is intrinsically one of the strongest materials known to man. Theoretically, standard silicate glasses should be able to support stresses as high as 14 to 20 gigapascals (2 to 3 million pounds per square inch (psi)). In practice, however, the strengths typically obtained are on the order of 70 megapascals (MPa), about 10,000 psi.

The explanation of the discrepancy between predicted and measured values is the existence of surface flaws or cracks. These flaws essentially fracture the siloxane network (Si—O—Si), which is the backbone of the glass. This damage to the glass acts to concentrate any applied force to the point of causing catastrophic failure of the glass article, typically at much lower stresses than otherwise expected. While described here for glass, this same theory can be applied to any brittle material not demonstrating significant plastic deformation prior to failure.

In the case of a glass container, for example, the surface flaws or defects can originate from many sources, ranging from unmelted batch materials to scratches produced by sliding across hard surfaces, including other glass articles. In a typical container-manufacturing facility for example, the glass articles can be heavily damaged by handling from the moment they are formed. Contact with particulates and moisture in the air, other bottles, guiderails and other handling equipment, and the conveyor on which they are transported, can lead to large decreases in the strength of the container due to the flaws produced.

Researchers have long sought a means to alleviate the problems with glass strength. Many modifications to the forming and handling process have led to unsatisfactory increases in the strength because these modifications in handling still leave flaws in the surface. For this reason, it has been a goal of researchers to reduce the effect of flaws after they are inevitably formed on the object.

Some approaches to improving the strength of glass include Aratani et al., U.S. Pat. No. 4,859,636, wherein metal ions in the glass are exchanged with ions of a larger radius to develop a surface compressive stress. Poole et al., U.S. Pat. No. 3,743,491, also relates to a surface compressive stress, but provides a polymer overcoat to protect the surface from further abrasion. Hashimoto et al., U.S. Pat. No. 4,891,241, relates to treating the surface of the glass with a silane coupling agent followed by a polymer coating containing acryloyl and/or methacryloyl groups, followed by irradiation or thermal treatment to polymerize the molecules containing those groups. The '241 patent further shows that silanes alone do not strengthen substrates and that acrylates are necessary for any strengthening.

While the patents described above each provide some improvement to the strength of the glass so treated, they are not without shortcomings. Some of these treatments require longer times than available during manufacturing, necessitating off-line processing. There are also concerns related to worker safety and health. In particular, the use and handling of organic solvents, as well as the acrylate and methacrylate compounds, are a safety and health concern to the manufacturer.

Therefore, there is an unmet need for a method of strengthening a brittle oxide substrate which addresses the above concerns as well as provides acceptable increases in strength to the brittle oxide substrate. There is also a need for a coated brittle oxide substrate which has a substantially improved strength when compared to a brittle oxide substrate without any coating.

Further, there is a need for a method of strengthening a brittle oxide substrate which will also provide acceptable labelability and/or humidity resistance.

In addition, there is a need for a polymerized cross-linked siloxane coated brittle oxide substrate wherein the cured coating is transparent.

Additional objects and advantages of the present invention will be set forth in part in the description which follows, and in part will be obvious from the description, or may be learned by practice of the present invention. The objects and advantages of the present invention will be realized and attained by means of the elements and combinations particularly pointed out in the appended claims.

BRIEF SUMMARY OF THE PRESENT INVENTION

To achieve the objects and in accordance with the purposes of the present invention, as embodied and broadly described herein, the present invention relates to a method of strengthening a brittle oxide substrate which includes the following steps. First, the brittle oxide substrate is coated with an aqueous solution containing a silane-based composition. The aqueous solution containing the silane-based composition is substantially absent of any organic solvent. Further, the silane-based composition upon being hydrolyzed in the aqueous solution has the following formula:

(OH)$_3$SiR"

with R" being an organofunctional group. After coating the aqueous solution containing the hydrolyzed silane-based composition onto the brittle oxide substrate, the coating is cured to form a transparent layer on the brittle oxide substrate. Also, R" in the silane-based composition is selected so that (i) the strength of the brittle oxide substrate having the cured coating is substantially improved compared to the strength of the brittle oxide substrate prior to the coating step and (ii) the cured coating does not interfere with the labelability of the brittle oxide substrate.

The present invention also relates to a method similar to the one described above, except R" is selected so that (i) the strength of the brittle oxide substrate having the cured coating is substantially improved compared to the strength of the brittle oxide substrate prior to the coating step and (ii) the substantially improved strength from the cured coating on the brittle oxide substrate has a maintained humidity resistance of at least about 50%.

Also, the present invention relates to a polymerized cross-linked siloxane coated brittle oxide container. In particular, the polymerized cross-linked siloxane coated brittle oxide container includes a brittle oxide container and a transparent layer of polymerized cross-linked siloxane preferably cured onto the outer surface of the brittle oxide container. The polymerized cross-linked siloxane is formed from a silane-based composition hydrolyzed in an aqueous solution and substantially lacks the presence of an organic solvent. The hydrolyzed silane-based composition, for example, can be selected from the group consisting of methacryloxypropyltrimethoxysilane (MPTMO), glycidoxypropyltrimethoxysilane (GPTMO), vinyltrimethoxysilane (VTMO), 2-(3,4 epoxycyclohexyl)ethyltrimethoxysilane (CETMO), methyltrimethoxysilane (MTMO), 3,3-dimethoxypropyltrimethoxysilane (DMPTMO), 5,6-epoxyhexyltrimethoxysilane (EHTMO) N-(trimethoxysilylpropyl)-maleic acid amide, 3-ureidopropyltrimethoxysilane (UPTMO), 1,2-bis(trimethoxysilyl)ethane (BTMOE), 1,2-bis(3-trimethoxysilylpropoxy)ethane (BTMOPE), hydrolyzed forms thereof and mixtures thereof.

The present invention further relates to novel silane-based compositions including, but not limited to, a mixture of vinyltrimethoxysilane and 2-(3,4 epoxycyclohexyl)ethyltrimethoxysilane; a mixture of methyltrimethoxysilane and 2-(3,4 epoxycyclohexyl)ethyltrimethoxysilane; a mixture of glycidoxypropyltrimethoxysilane, 2-(3,4 epoxycyclohexyl)ethyltrimethoxysilane, and methyltrimethoxysilane; and a mixture of glycidoxypropyltrimethoxysilane and 2-(3,4 epoxycyclohexyl)ethyltrimethoxysilane.

The above generally described invention overcomes the difficulties encountered in working with brittle oxide substrates such as glass. The method of the present invention drastically and unexpectedly increases or restores the strength of brittle oxide substrates as compared to the strength of the substrate prior to receiving any coating. Further, the coatings of the present invention are transparent and safe to use on brittle oxide substrates. Besides increasing or restoring the strength of the substrate, the coatings of the present invention preferably do not interfere with labelability which has been a problem in the past with coatings on substrates.

It is to be understood that both the foregoing general description and the following detailed description are exemplary and explanatory only and are not restrictive of the present invention, as claimed.

DETAILED DESCRIPTION OF THE PRESENT INVENTION

The brittle oxide substrate used in the method of the present invention can be made of any brittle oxide material such as aluminum oxides or aluminates, silicon oxides or silicates, titanium oxides or titanates, germanates, or glass made from, for instance, the above materials. Further, the brittle oxide substrate can be of any form such as a glass bottle.

The silane-based compositions upon being hydrolyzed in the aqueous solution have the following formula:

(OH)$_3$SiR"

wherein R" is an organofunctional group which may or may not hydrolyze in the aqueous solution. This organofuctional group may include residues of hydrolyzable silanes. The selection of R" is further based on the requirement that the resulting aqueous solution containing the hydrolyzed silane-based composition after being coated and cured on the brittle oxide substrate imparts a substantially improved strength to the brittle oxide substrate and does not interfere with the labelability of the brittle oxide substrate.

Preferred examples of R" include glycidoxypropyl, 2-(3,4 epoxycyclohexyl)ethyl, 3,3-dimethoxypropyl, 3-ureidopropyl, and hydrolyzed forms thereof.

Accordingly, preferred examples of the hydrolyzed silane-based compositions include hydrolyzed glycidoxypropyltrimethoxysilane, hydrolyzed 2-(3,4 epoxycyclohexyl)ethyltrimethoxysilane, hydrolyzed 3-ureidopropyltrimethoxysilane, and hydrolyzed 3,3-dimethoxypropyltrimethoxysilane.

The coating applied to the brittle oxide substrate can also be a mixture of one or more hydrolyzed silane-based compositions. The mixture of two or more hydrolyzed silane-based compositions is especially advantageous when it is known that one hydrolyzed silane-based composition provides excellent labelability and another hydrolyzed silane-based composition provides excellent strength enhancing properties. Thus, a mixture would provide the desired balance of properties, that is, a coating which provides improved strength and which does not interfere with labelability. For instance, a mixture of hydrolyzed CETMO and methyltrimethoxysilane (MTMO) can be used to obtain this balance of properties.

Other examples of hydrolyzed silane-based compositions which can be used in mixtures of one or more hydrolyzed silane-based compositions include hydrolyzed methacryloxypropyltrimethoxysilane, hydrolyzed 3-ureidopropyltrimethoxysilane, hydrolyzed 1-2-bis(trimethoxysilyl)ethane, hydrolyzed 1,2-bis(3-trimethoxysilylpropoxy)ethane, hydrolyzed 5,6-epoxyhexyltrimethoxysilane, hydrolyzed N-(trimethoxysilylpropyl)-maleic acid amide, hydrolyzed dimethyltetramethoxydisiloxane, and hydrolyzed N-(3-triethoxysilylpropyl)4-hydroxybutyramide (HBTEO). These compositions, for instance, can be used in a mixture with hydrolyzed CETMO and/or hydrolyzed GPTMO and/or hydrolyzed DMPTMO. Generally, the silane-based compositions used in a mixture can be added in equal proportions. Of course, if stronger labelability properties are desired, a greater proportion of hydrolyzed CETMO, hydrolyzed GPTMO, or hydrolyzed DPTMO, for instance, would be added. Further, any of the compositions described herein can be used alone to substantially improve the strength of a brittle oxide substrate, if labelability is not a concern.

Unless stated otherwise, the silane-based compositions provided as specific examples are commercially available from one or more of the following sources, Union Carbide, Dow Corning, Huls America and PCR, Inc.

While the coatings of the present invention can be mixtures of one or more hydrolyzed silane-based compositions, separate coatings of hydrolyzed silane-based compositions can be applied to a surface of a brittle oxide substrate. For example, a coating of CETMO can be applied to a surface of a brittle oxide substrate and then while the CETMO coating is still wet or dry or after curing the first coating, a second coating, another CETMO coating or a different coating (e.g. MPTMO), can be applied.

Any number of such consecutive separate coatings can be applied in this manner. Further, a surfactant can be applied in this manner, namely, coating a brittle oxide surface with a surfactant before and/or after coating the surface with a hydrolyzed silane-based composition(s). Even coatings like that of Hashimoto et al. (U.S. Pat. No. 4,891,241) can be applied after applying the coatings of the present invention.

It is to be understood that by applying the coating(s) of the present invention to a surface of a brittle oxide substrate, this also includes applying the coating(s) of the present invention to any previous coating on the brittle oxide substrate. An example of a previous coating would include hot-end coatings, typically applied in the industry.

The silane-based compositions used in the method of the present invention can be present in the aqueous solution at an average concentration from about 1% to about 99% by weight in water or aqueous solution, preferably from about 1% to about 30% and most preferably from about 2% to about 10%.

With regard to the aqueous solution containing a hydrolyzed silane-based composition, the amount of water added to the silane-based composition to prepare the aqueous solution of the present invention is based on the concentration of the resulting aqueous solution desired. A more dilute hydrolyzed silane-based composition would simply mean that more aqueous solution containing the hydrolyzed silane-based composition would need to be coated onto the brittle oxide substrate to achieve the substantially improved strength in the brittle oxide substrate.

As used herein, the term "solution" includes chemical solutions, suspensions, emulsions, and mixtures, any of which may exhibit complete or incomplete intermixing.

The aqueous solution containing the hydrolyzed silane-based composition can be prepared all at once, meaning the silane-based composition is added to water at the manufacturing facility. Alternatively, the hydrolyzed silane-based composition can be prepared as a neat or concentrate and, at the user site, can be diluted with water in order to prepare the aqueous solution containing the hydrolyzed silane-based composition for actual coating onto the brittle oxide substrate.

Further, the aqueous solution containing the hydrolyzed silane-based composition of the present invention is substantially free of an organic solvent, meaning no organic solvent is intentionally added to the solution. Some organic compounds, however, may be present as an impurity and/or by-product of the silane-based composition reacting with water or the aqueous solution reacting upon curing. Further, some of the commercially available silane-based compounds may contain organic solvents which are diluted upon being introduced into the aqueous solution so that the percent solvent is approximately equal to or less than the silane concentration in the aqueous solution. One example is UPTMO.

Of course, it is known that the addition of a solvent can increase the stability of a solution.

The following reaction scheme sets forth the two reactions which are believed to occur in the preparation and application of the aqueous solution containing the hydrolyzed silane-based composition.

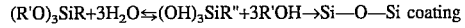

$(R'O)_3SiR + 3H_2O \rightleftharpoons (OH)_3SiR'' + 3R'OH \rightarrow Si-O-Si$ coating In this reaction, the trialkoxy silane reacts in water to form the trisilanol in solution. The trisilanol in solution can contain oligomers. Then, the trisilanol in solution condenses to form the polymerized cross-linked siloxane (Si—O—Si) coating upon curing. This siloxane (Si—O—Si) coating generally contains an organic substituent(s) such as the R" group (s).

In this reaction scheme, R'O can be any group that is hydrolyzable. The following R' groups best meet this criteria, —CH$_3$, —C$_2$H$_5$, and

$$\overset{O}{\underset{\|}{-CCH_3}}.$$

However, other groups which meet this criteria are well known to those skilled in the art.

The R group is an organofunctional group that may hydrolyze during the hydrolysis reaction to form the R" group. This organofunctional group can be a residue of a hydrolyzable silane. Following the hydrolysis reaction and if the R group is hydrolyzable, the R" group contains at least one hydroxyl (OH) group. If the R group is not hydrolyzable, then R and R" would be the same, for instance, when R is vinyl or methyl. In general, the R group in the above reaction scheme is preferably selected so that the silane-based compositions of the present invention provide the appropriate balance between improved or restored strength and labelability. Accordingly, preferred examples of the R group include glycidoxypropyl, 2-(3,4 epoxycyclohexyl)ethyl, and 3,3-dimethoxypropyl. Further, preferred examples of the R" group would be hydrolyzed versions of these preferred R compounds.

The above-described reaction scheme by no means is meant to limit the manner in which the aqueous solution containing the silane-based composition is prepared. Instead of starting with trialkoxy silanes, one can just as easily begin with any hydrolyzable silane. For instance, halide silanes such as substituted trichlorosilanes.

As noted above, upon hydrolysis, the R group can become hydroxyl (OH) containing as the R" group. For example, CETMO and GPTMO which both have an epoxy ring in the R group, upon hydrolysis in the aqueous solution, will result in a dihydroxy group by the opening of the epoxide ring while the rest of the R" group remains hydrophobic. Thus, the R" group has a balance of hydrophilic (provided by the OH groups) and hydrophobic properties. The hydrophilic properties in the R" group particularly improve the strength and the labelability.

A surfactant can be added to the aqueous solution containing the hydrolyzed silane-based composition to improve coverage of the aqueous solution containing the hydrolyzed silane-based composition around the brittle oxide substrate surface which results in a greater strengthening of the brittle oxide substrate and better appearance. Generally, only a small amount of surfactant is added to allow the silane coating to spread out better on the brittle oxide substrate. Non-ionic surfactants have been especially useful in this regard. One example of such a surfactant is commercially available Triton X-102 (obtained from Union Carbide) which is octylphenoxy polyethoxy ethanol. Generally, from about 0.001 wt. % to about 1.0 wt. % (based on total weight of solution) of a surfactant can be added. Preferably, from about 0.01 wt. % to about 0.05 wt. % (based on total weight of solution) of a surfactant is added.

Those skilled in the art will realize that other compounds, pounds (e.g., a lubricant) can be added to the aqueous solution containing the silane-based composition for the purpose of improving the wetting, or providing other effects such as U.V. stability or control of rheological properties.

The pH of the aqueous solution containing the silane-based compositions are generally adjusted to the range of about 1.5 to about 12 (e.g., a range of 1.5 to 11) with the pH usually being adjusted in the preferred range of about 2 to about 4 because the aqueous solutions during testing have shown to be most stable at this pH range. Generally, the pH of the aqueous solutions containing the hydrolyzed silane-based compositions is adjusted based upon the R" group selected. The pH of the aqueous solutions can be adjusted to the desired pH by the addition of a basic or acidic compound.

The aqueous solution containing the hydrolyzed silane-based composition can be affected by aging which can eventually result in a decrease in the amount of strengthening improvement of the brittle oxide substrate. Interestingly, slight aging can, in certain circumstances, be beneficial; for instance GPTMO. However, with further aging, there is an eventual decrease in properties. The shelf life of the aqueous solutions containing the hydrolyzed silane-based compositions is based on a composition by composition basis. For instance, with respect to an aqueous solution wherein the hydrolyzed silane-based composition is hydrolyzed CETMO, a shelf life of at least 100 days is possible without any effect on the ability to substantially improve the strength of the brittle oxide substrate.

The aqueous solution containing the hydrolyzed silane-based composition is deposited or coated onto the substrate surface by spraying, dripping, dipping, painting, or any other techniques suited to the application of liquids, vapors, or aerosols. Preferably, the aqueous solution containing the hydrolyzed silane-based composition is applied as a spray in an added or substituted spray step in the present commercial production and treatment of glass containers such as bottles, discussed below, using conventional spray equipment.

The coating of the present invention can be applied directly onto any surface (e.g., internal, external, or portions thereof) of the brittle oxide substrate or can be applied to an exterior layer the composition of which is different from that of the brittle oxide substrate. For instance, the coating of the present invention can be applied to a tin-, titanium-, silicon-, or other metal-oxide layer or mixtures of such materials and still be effective in strengthening the brittle oxide substrate.

Typically, in the production of glass containers such as bottles, the bottles, which are on a conveyor line pass through 1) a hot end coating hood wherein a layer of an inorganic tin is applied, such as tin oxide; 2) an annealing lehr; and 3) a lubricant spray step. By using the method of the present invention, the application of the aqueous solution containing the silane-based solution preferably occurs after the glass bottles exit the annealing lehr and would be considered a cold-end coating.

The aqueous solution containing the silane-based composition can be applied at any temperature below the boiling point of the aqueous solution, but generally is applied at or near room temperature.

Further, while the aqueous solution containing the silane-based composition can be applied at any brittle oxide (e.g. bottle) surface temperature above the freezing point of the aqueous solution, a brittle oxide surface temperature from about 20° to about 200° C. is preferred, and a surface temperature from about 50° to about 60° C. is most preferred.

Once the brittle oxide substrates (e.g. glass bottles) are coated with the aqueous solution containing the silane-based composition, the coated brittle oxide substrates enter a curing unit, such as a curing oven, wherein the surfaces of brittle oxide substrates usually obtain a temperature of at least about 230° C. Certainly, effective curing with surface temperatures lower than 230° C. are possible with certain silane-based coatings such as with BTMOE. Once this surface temperature is obtained effective curing occurs. For instance, the surface temperature can be held at the at least about 230° C. for about 30 seconds. The temperatures used during curing need to be high enough to cure the coated brittle oxide substrates without browning the coating. The temperature range for effective curing is based, in part, on the R" group selected. For instance, for hydrolyzed CETMO, generally, temperatures below about 200° C. provide marginal results and temperatures above about 350° C. result in the charring of the coating.

The cure step in the method of the present invention can be effected by the application of energy of any source at a magnitude sufficient to remove, e.g., water or other non-coating reaction products from the surface of the treated brittle oxide substrate, provided that such application is not deleterious to either the brittle oxide substrate or the coating material. The curing step, being a combined function of energy and time, can include a low magnitude of energy for a relatively long time, or the reverse, an application of a high magnitude of energy limited as noted hereinabove, for a relatively short period of time. Examples of such energy sources include microwave, infrared, ultraviolet (UV), irradiation or exposure to ambient or elevated temperatures, such as in an electric or gas heating oven, at, above or below atmospheric pressure, or a combination of such conditions.

After exiting the curing step, a conventional lubricant spray step, mentioned above, can be used to add a polymer coating such as polyethylene to the brittle oxide substrates for purposes of lubricity. The coatings of the present invention permit the adhesion of the lubricant to be at least as good as the adhesion of the lubricant to the hot end coating discussed above.

With the coatings of the present invention, it is possible to obtain sufficient lubricity in the brittle oxide substrate in order to avoid any lubricant spray step, especially with regard to bottle manufacturing.

Strength, as described herein, refers to the maximum load a specimen can withstand prior to catastrophic failure (and destruction of the article). There are numerous methods for measuring failure strength dependent upon sample geometry and article application. These include bending strength, vertical load, burst pressure, concentric ring strength, and impact testing.

The method of the present invention actually strengthens the brittle oxide substrate. As stated in the background, theoretically, all brittle oxide substrates, especially glass, are damaged in some way by minute flaws or by the presence of small impurities. Since the brittle oxide substrates theoretically should have a much higher strength, one could characterize the present invention as a method of restoring strength to a brittle oxide substrate since the method of the present invention is providing a degree of strength to the brittle oxide substrate which is closer to its theoretical strength.

One way of measuring the actual strength of the brittle oxide substrate with and without the coating of the aqueous solution containing a hydrolyzed silane-based composition is by a concentric ring strength test as described in the Journal of Strain Analysis, Vol. 19, No. 3 (1984) and the Journal of Non-Crystalline Solids, 38 & 39, pp. 419–424 (1980), which is a test commonly recognized by those skilled in the art.

Another way of measuring the strength is by a burst pressure strength test as described in ASTM Test C-147 using a ramp pressure tester (obtained from AGR, Intl. Literature), which is a test also commonly recognized by those skilled in the art.

A further way of measuring the strength is by an impact strength test as described in the instructions which are provided with the AGR Impact Tester. This test is industry recognized and is accomplished with the use of an AGR impact tester unit obtained from AGR, Int'l., Butler, Pa. The strength test is commonly recognized by those skilled in the art as well.

As noted, the application of the aqueous solution containing the hydrolyzed silane-based composition of the present invention substantially improves the strength of a brittle oxide substrate. The substantial strength improvement is demonstrated by the concentric ring strength, burst pressure strength, or impact strength improving at least about 10%. Preferably the strength improvement is at least 20%.

Those skilled in the art will recognize that by increasing the strength of a brittle oxide substrate or article, e.g., glass, a lesser amount of oxide substrate is needed to form an article of substantially equivalent strength and general mechanical performance. Thus, in the specific case of a glass container (e.g., the strength of the uncoated glass container in the range of 10 to 600 psi as measured by burst pressure testing) such as a bottle, for instance, the bottle can be lighter in weight than its untreated counterpart. Furthermore, increasing the strength leads to less failures of the product (e.g., less breakage) during commercial use.

It is theorized that the polymerized cross-linked siloxane linkage occurs within the coating, as well as between the coating and the brittle oxide substrate surface. The coating, after bonding to the surface, can act to heal cracks in the surfaces by forming an Si—O—Si network across the flaw surfaces. The formation of the siloxane bonds in the region of the flaws acts to provide an increase in the breaking stress of the article.

For a coating to actually restore or increase strength to a sample which has previously been damaged, the effect of stress-concentrating flaws on the tension-bearing surface must be minimized. This requires a partial or complete healing of the flaws in the tension-bearing surface. For a glass container being pressure-tested, the surface experiencing tension is predominantly the external surface of the bottle since the walls actually bow outward as pressure is increased. In general, that external surface will be the one which develops a convex curvature during loading.

It is possible, however, to increase the load required for impact failure of a sample without necessarily restoring strength to the substrate. This technique makes use of a coating on the surface being impacted, rather than the side experiencing the tensile strength. (Impact generally induces a tensile stress in the interior surface of a container.) The mechanism in this case relies upon the ability of the coating to absorb the energy of the impact such that the energy is not transmitted to the substrate in the form of a flexural stress. The measured impact load for failure will be increased, but the flexural strength of the object will not have changed.

Commercially produced glass containers (e.g., a wall thickness in the range of 0.1 to 6 mm) are typically coated with a metal-oxide film shortly after fabrication, using chemical vapor deposition; this is referred to as a hot-end coating (HEC). Generally, this coating will be tin oxide, but can be titanium or other metal oxide, and can have other ingredients to enhance physical properties, e.g., electrical conductivity. This coating is typically about 50 to 125 Å thick. The present invention restores or increases the strength of damaged glass, whether or not a previously deposited HEC exists on the surface.

With respect to labelability of the brittle oxide substrate, it is to be understood that certain cured hydrolyzed silane-based coatings of the present invention do not interfere with this labelability as discussed previously. Labelability is measured by the following label peel test.

A paper label with four corners and having an area of about 6 square inches is used. The label is weighed prior to the application of a non-casein type adhesive identified as 4242 available from National Starch. About 0.6 grams of the non-casein type adhesive is applied to the back of the label (opposite side) and spread on the label by rolling with a 5 mm glass rod or similarly shaped object to uniformly spread the adhesive on the label. The label is pressed on a surface of a brittle oxide substrate and allowed to dry for a minimum of two hours at room temperature. The label is peeled by hand at every corner until a portion of the label tears from every corner of the substrate. A coating is considered to have acceptable labelability for purposes of the present invention if greater than about 50% by weight of the label remains on the surface of the brittle oxide substrate.

Preferably, the labelability (based on the % by weight of the label remaining on the surface of the brittle oxide substrate) of the coated brittle oxide substrates of the present invention is greater than about 60%, most preferably greater than about 70% by weight.

The substantially improved strength from the cured coating on the brittle oxide substrates can also exhibit a maintained resistance to the detrimental effects of humidity. In fact, a humidity resistance test provides an acceptable way of determining how well the coatings of the present invention allow a coated brittle oxide surface to retain the improved or restored strength. The excellent and maintained resistance to humidity which can be exhibited by the silane-based coatings of the present invention is generally dependent upon the R" group. One way to determine the effect of humidity on the coatings of the present invention is to compare the strength of coated brittle oxide substrate when the cured coating on the substrate is less than 3 hours old at relative humidity which generally is approximately 40%, with the strength of the same coated brittle oxide substrate subjected to a 90% humidity for a period of 30 days. In such a test, the humidity resistance of the cured coatings of the present invention applied to the brittle oxide substrates has only about a 50%, preferably only about 20–30%, most preferably 0–10%, change in strength which is excellent, especially for purposes of glass bottles subjected to high humidity environments such as in the southern United States.

Interestingly, not all of the hydrolyzed silane-based coatings provide excellent humidity resistance once coated onto a brittle oxide substrate. For instance, and as a comparison, when a hydrolyzed silane-based composition, wherein R" is vinyl or methyl, is coated onto a brittle oxide substrate and cured, the strength of the substrate substantially improves, (e.g., 110% improvement (concentric ring test) when R" is vinyl and 200% improvement (concentric ring test) when R" is methyl) and excellent humidity resistance is obtained (e.g., 0% loss (100% strength maintained) when R" is vinyl and 0% loss (100% strength maintained) when R" is methyl); however, when a hydrolyzed silane-based composition, wherein R" is 2-(3,4 epoxycyclohexyl)ethyl or glycidoxypropyl, is coated onto a brittle oxide substrate and cured, while the strength of the coated substrate substantially improves (e.g., 200% improvement (concentric ring test) when R" is 2-(3,4 epoxycyclohexyl)ethyl and 200% improvement (concentric ring test) when R" is glycidoxypropyl), only fair humidity resistance is obtained (e.g., 40–50% loss (50–60% strength maintained) when R" is 2-(3,4 epoxycyclohexyl)ethyl and 90–100% loss (0–10% strength maintained) when R" is glycidoxypropyl).

This is all the more interesting when the labelability of these coatings are compared:

| R" | Labelability |
| --- | --- |
| methyl | 0% |
| vinyl | 0–10% |
| 2(3,4 epoxycyclohexyl)ethyl | >60% |
| glycidoxypropyl | >60% |

However, as stated earlier, the coating applied to the brittle oxide substrate can be a mixture of one or more hydrolyzed silane-based compositions.

Thus, the present inventors have discovered mixtures which provide substantially improved strength along with excellent labelability and humidity resistance. A mixture of a hydrolyzed silane-based composition wherein R" is methyl and 2-(3,4 epoxycyclohexyl)ethyl is one excellent example. It is all the more remarkable that when such a mixture is made, none of the individual components in the mixture detract from any of the desired properties. For instance, the presence of MTMO does not detract from the labelability properties.

The aqueous solutions containing the hydrolyzed silane-based compositions of the present invention are non-flammable especially in view of the fact that there is a substantial absence of organic solvents in the aqueous solution.

When coating brittle oxide substrates, especially glass containers, it is preferred that the hydrolyzed silane-based composition is not visible on the container. The silane coating should not discolor or become textured upon curing. The hydrolyzed silane-based compositions of the present invention meet this criteria. It is noted that in some commercial applications, a coating which is diffused (some haze or fresco) is desired. The coatings of the present invention are also capable of this diffused appearance by using an application temperature (e.g. brittle oxide substrate surface temperature) of from about 80° C. to about 100° C.

Further, color dyes can be added to the aqueous solution in order to make colored coatings. Examples of suitable dyes include Celestine blue, Bismark brown, and Eriochrome black.

Further, dyes can be used in the aqueous solution for indicating the degree of cure and spray coverage. In addition, other components can be included in the aqueous solution, such as UV blockers and fluorescing agents. Including a fluorescing agent will permit the coated brittle oxide substrates to have a "glow-in-the-dark" property.

The coatings of the present invention also advantageously have the ability to hide visible scuff damage to a substrate surface. This is particularly desirable in the refillable bottle industry wherein bottles eventually develop a whitened track around the bottle from numerous cycles through a filling line.

The present invention will be further clarified by the following examples, which are intended to be purely exemplary of the present invention.

EXAMPLE 1

In this example, soda-lime glass rods were indented with a Vickers diamond to produce approximately 50-micrometer (um) flaws in the surface. These rod samples were tested to failure in bending, and had average strengths of 56 MPa. Samples with identical flaws were spray-coated with a solution of 10 percent by weight (wt. %) of vinyl trimethoxysilane (VTMO) in water. The solution contained enough sulfuric acid to adjust the pH to between 3.0 and 3.4. The samples were thereafter heat-treated for 15 minutes (min.) at 200° C., and tested in bending. The average strength of these samples increased from 56 MPa to 90 MPa.

EXAMPLE 2

Example 2 is a modification of Example 1. In this example, the samples were again indented rods, and the solution was 10 wt. % VTMO, acidified as set forth in Example 1. This solution also contained 0.75 wt. % of the nonionic surfactant Triton X-102. After curing, the indented samples increased in strength from 56 MPa to 93 MPa.

EXAMPLE 3

Example 3 is identical to Example 1, with the exception that the silane used was methyltrimethoxysilane (MTMO). The control samples had an average strength of 62 MPa. Upon coating and curing, the bend strength was increased to 96 MPa.

EXAMPLE 4

Example 4 is a duplication of Example 2, using MTMO. The average control strengths were again 62 MPa, but the strengthened samples averaged 103 MPa.

EXAMPLES 5 and 6

Examples 5 and 6 are duplicates of Examples 1 and 2, respectively, with the exception that the silane used was methacryloxypropyltrimethoxysilane (MPTMO). For these samples, the average control strength was 60 MPa.

Once coated, these samples were thermally cured as described above, but were also subjected to an additional UV irradiation in order to enhance the curing. The strengthened samples for Example 5 attained an average strength of 126 MPa, while those for Example 6 reached 124 MPa.

EXAMPLE 7

This example illustrates the treatment of flat-glass samples which were indented with a Vickers diamond to form a controlled flaw. Samples were indented such that 90-um flaws were produced. These samples were coated with a silane solution consisting of three silanes in the same weight proportion. The overall silane concentration was 10 wt. % in water, while the amount of each silane was about 3.33 wt. %. The solution contained enough sulfuric acid to bring the pH to between 3.0 and 3.4. A nonionic surfactant, Triton X-102, was added in the amount of 0.75 wt. % in order to increase wetting. The 1:1:1 solution consisted of glycidoxypropyltrimethoxysilane (GPTMO), 2-(3,4 epoxy-cyclohexyl)ethyltrimethoxysilane (CETMO), and MTMO.

The control strengths were 45 MPa, while the samples treated with the 1:1:1 solution were 160 MPa after a two-step cure consisting of a 15-minute cure at 125° C., followed by a cure at 225° C. for 10 minutes, an increase in strength of about 3.5 times. Good labelability was also found for this mixture even though MTMO (generally exhibiting poor labelability by itself) was present in the formulation.

EXAMPLE 8

The same control samples as described in Example 3 were strengthened using a 1:1 solution of GPTMO and CETMO, also in a 10 wt. % total concentration. The solution contained enough sulfuric acid to bring the pH to between 3.0 and 3.4. These samples underwent the same heat treatment described in Example 3. The strength of the treated samples was increased to 118 MPa from the starting strength of 45 MPa, for an increase in strength of about 2.6 times.

EXAMPLE 9

The same flaws described in Example 3 were applied to the sidewalls of amber bottles. The average burst pressure of these flawed containers was 1.9 MPa. The flawed bottles were then silane-treated, using a 10 wt. % solution of CETMO and the same cure procedure described in Example 3. The average burst strength of the treated control-flawed samples was increased to 3.2 MPa, an increase of 68% over the flawed control samples.

EXAMPLE 10

Standard 12-ounce (oz.) beer bottles were indented as described in Examples 3 and 9. The average burst pressure of these flawed containers was 1.9 MPa. Samples were coated and cured with the 1:1:1 solution as described in Example 7. The average burst strength was increased from the control value of 1.9 MPa to 3.5 MPa for the treated samples.

EXAMPLE 11.

Lightweight 12-oz. bottles were indented as set forth above, and coated with the 10% CETMO solution described in Example 9. The average burst pressure for the indented controls was 1.5 MPa. Upon spray-coating, and subsequent curing as set forth in Example 3, the average burst pressure of the bottles was increased to 2.6 MPa.

EXAMPLE 12

Lightweight 12-oz. bottles were coated in the as received state with a 10 wt. % solution of CETMO. The burst strength of the control samples was 1.6 MPa. The coated and cured samples had an average burst strength of 3.0 MPa.

EXAMPLES 13 THROUGH 16

In these examples, soda-lime flat-glass specimens were indented with a Vickers diamond tip to produce the 50-um flaws on the surface as described in Example 1. These samples were tested with a concentric-ring fixture. The mean strength of these uncoated samples was 69 MPa.

EXAMPLE 13

A suspension of MPTMO was prepared by adding the silane to water acidified to a pH of 2.5 with a suitable acid, e.g., $H_2SO_4$, to give a 10 wt. % mixture. 0.5 wt. % Triton X-102 was added, and the composition aged for 24 hours at room temperature. The condensing oligomers phase-separated at room temperature after 24 hours, forming a suspension. This suspension was applied by drip-coating over the flaw region and heat-treating for 15 min. at 125° C., followed by an UV cure. The mean flat-glass strengths were 223 MPa.

EXAMPLE 14

A 10 wt. % suspension of methacryloxypropylmethyldi-ethoxy-silane (MPMDEO) was prepared using the same procedure as described in Example 10, but using the surfactant at a 1 wt. % level. The suspension was drip-coated on flat glass and the coating was cured for 15 min. at 125° C. followed by a cure at 225° C. for 10 min. The treated flat-glass specimens had mean strengths of 143 MPa.

EXAMPLE 15

A 10 wt. % suspension containing a 1:1 wt. mixture of dimethyltetramethoxydisiloxane and MPMDEO was prepared as described in Example 10, except that acetic acid was used to adjust the pH to 3.5, and no surfactant was added. The sample received a dual cure as described in Example 14. The treated flat-glass specimens had mean strengths of 193 MPa.

EXAMPLE 16

A 10 wt. % suspension containing a 1:1 wt. mixture of di-tert.-butoxydiacetoxysilane (DBDAS) and MPMDEO was prepared as described in Example 14, except that $H_2SO_4$ was used to adjust the pH to 3.5, and 0.025 wt. % Triton X-102 was added. The sample received a dual cure as described in Example 12. The treated flat-glass specimens had mean strengths of 152 MPa.

EXAMPLE 17

In this example, flat soda-lime glass specimens were indented with a Vickers diamond to produce approximately 50-um flaws. The samples were tested with a concentric-ring fixture, and had average strengths of 69 MPa. A solution of 10 wt. % of DBDAS in water was adjusted with acetic acid to a pH of 3.5. The solution was drip-coated onto a flat glass specimen, and the article thermally cured for 15 min. at 125° C. The cured specimens had a mean strength of 133 MPa.

EXAMPLE 18

Flat-glass specimens were treated as in Example 17. The pH of a solution of 10 wt. % GPTMO in water was adjusted with $H_2SO_4$ to 3.5. The solution was stored at room temperature for two weeks, after which the flawed slides were drip-coated with the solution and cured first at 125° C. for 15 min. and then at 225° C. for 10 min. The mean strength was 219 MPa.

EXAMPLE 19

Flat soda-lime-glass specimens were indented with a round diamond tip to produce a readily visible impact flaw. The specimens had mean concentric-ring strengths of 43 MPa.

The pH of an aqueous solution of 30 wt. % CETMO in water was adjusted with $H_2SO_4$ to 3.5. The solution was drip-coated onto the flawed slide and thermally cured at 125° C. for 15 min. and then at 225° C. for 10 min. The mean strength was 61 MPa.

EXAMPLE 20

Soda-lime glass flat-glass specimens were indented with a Vickers diamond to produce approximately 50-um flaws. These samples were tested with a concentric-ring fixture, and had average strengths of 69 MPa. A solution of 10 wt. % N-(3-triethoxysilylpropyl)-4-hydroxybutyramide (HBTEO) was prepared in water and allowed to stand for 30 days; the pH was 9.5. The flawed slides were then drip-coated with the solution, and dual-cured at 125° C. for 15 min., followed by 225° C. for 10 min. The tested mean strength after treatment was 266 MPa.

EXAMPLE 21

Soda-lime flat-glass specimens were indented with a Vickers diamond to produce approximately 50-um flaws. These samples were tested with a concentric-ring fixture, and had average strengths of 69 MPa.

Flat-glass specimens were dip-coated with undiluted MPTMO, then cured by passing them three times through a UV curing apparatus at an energy level of 5.3 Joules per square centimeter per pass. The mean strength of specimens so treated was increased to 104 MPa.

EXAMPLE 22

Soda-lime flat-glass specimens were indented as set forth in Example 21, and then coated with 150Å of pyrolytically deposited $SnO_2$. The samples were then annealed to remove residual stresses. Tin-oxide-coated control samples strengths of about 83 MPa.

The SnO2-coated specimens were then treated with a 10 wt. % solution of MTMO as described in Examples 3 and 4, producing specimens with strengths of 210 MPa.

EXAMPLE 23

Soda-lime flat-glass specimens were indented with a Vickers diamond to produce approximately 50-um flaws. These samples were tested with a concentric-ring fixture, and had average strengths of 69 MPa. A solution of 10 wt. % of 3,3-dimethoxypropyltrimethoxysilane (DMPTMO) in water was prepared, and the pH adjusted to 3.5. After standing for two hours at room temperature, one portion of the solution was used to drip-coat the flawed slides. The slides were then cured at 125° C. for 15 min. and then at 225° C. for 10 min. The mean strength for the treated slides was 88 MPa. $^1$H nuclear-magnetic-resonance (NMR) analysis of the DMPTMO solution showed only the —CH(OCH$_3$)$_2$ group of the silane triol as a signal at 4.41 (triplet) ppm.

Another portion of the same solution, after standing 192 hours at room temperature, was used to drip-coat different slides flawed identically, and then cured as above. The mean strength of these slides was 256 MPa. NMR analysis of this solution showed —CH(OH)(CH$_3$), —CH(OH)$_2$, and —CHO groups of the silane triol in equilibrium with an approximate abundance of 4:4:2 as signals at 4.55 (triplet), 4.90 (triplet) and 9.63 (singlet) ppm, respectively.

EXAMPLE 24

The present invention was tested at a bottling manufacturing facility based on the following procedure: 120 16-ounce glass beverage containers were pressure tested prior to treatment using an AGR ramp pressure tester. The average burst pressure measured was 422 psi (2.9 MPa), and the percentage of the bottles failing below 300 psi (2.1MPa) was 15%. The treatment process consisted of spraying a solution of the present invention (specifically, CETMO), thermally curing to achieve 230° C. or better, followed by a standard cold-end-coating application. 120 containers having this treatment were burst-pressure tested in the same manner as those described above, yielding an average burst pressure of 490 psi (3.4 MPa) (increase of 16%) and a failure rate below 300 psi (2.1 MPa) of 6% (a decrease of 57%).

EXAMPLE 25

Vickers indented float glass was drip coated with an aqueous 10% solution of 3-ureidopropyltrimethoxysilane (UPTMO) having a pH of 3.4 and 0.05% Triton X-102 surfactant. The samples were thereafter heat treated at 125° C. for 15 minutes followed by 225° C. for 10 minutes. The concentric ring strengths were

| uncoated | 9588 psi (66.1 MPa) |
| coated | 25492 psi (176 MPa) |

EXAMPLE 26

Example 25 was repeated with the exception that the silane was 1,2-bis(trimethoxysilyl)ethane. The control samples had an average concentric ring strength of 11566 psi (79.8 MPa). After coating and curing, the average concentric ring strength was 19728 psi (136 MPa).

EXAMPLE 27

Example 26 was again repeated with the exception that the heat treatment consisted of only heating at 125° C. for 15 minutes. The average strength went from 11566 psi (79.8 MPa) (uncoated) to 23799 psi (164 MPa) after coating and curing.

EXAMPLE 28

Example 25 was repeated with the exception that the silane was 1,2-bis(3-trimethoxysilylpropoxy)ethane. BTMOPE was made using the following procedure.

Allyl bromide, 0.7 mole, was added dropwise over 1.5 hrs. to a stirred mixture of 0.33 mole of ethylene glycol, 1.25 moles of 50 % aqueous sodium hydroxide and 0.025 mole of tributylmethylammonium chloride. The mixture was heated at 80°–90° for 12 hours. The mixture was cooled to 25° C. and the aqueous phase separated and was discarded. The organic phase was diluted with 5 volumes of ethyl ether, washed with saturated sodium chloride solution and dried over sodium sulfate. 1,2-bis(allyloxy)ethane, BAOE, was isolated by distillation under reduced pressure, b.p 89°–90° C. @ 50 torr.

A mixture of 0.075 mole of BAOE and 50 microliters of platinum divinyl complex in xylene (Huls America, cat # PC072) was heated to 85° C. Trimethoxysilane, 0.160 mole, (Aldrich Chem. Co.) was added dropwise to the stirred mixture over a 2 hour period under an inert atmosphere. The mixture was stirred at 85° C. for 2 hours then distilled under reduced pressure. BTMOPE was isolated as the fraction with a boiling point 135°–136° C. at 0.25 torr. The concentric ring strengths of the samples changed from 10139 psi (69.9 MPa) (uncoated) to 29183 psi (201 MPa) after coating and curing.

EXAMPLE 29

Example 27 was repeated using the silane of Example 28. The strength of the coated and cured samples averaged 30153 psi (208.0 MPa) while the controls average 10139 psi (69.9 MPa).

EXAMPLE 30

0.5 wt. % Celestine Blue dye (CAS # 1562-90-9) was added to a 5% solution of CETMO that also contained 0.025% Triton X-102 surfactant. The solution was then spray applied onto 16-oz beverage containers using 2.0 g of solution/bottle. The samples were then heat treated for 33 seconds in an infrared oven set at 700° C. The coated bottles had a uniform blue coating.

EXAMPLE 31

To a 10% CETMO solution containing 0.05% Triton X-102 surfactant was added 1 wt. % each of Uvinul MS-40 (obtained from BASF Corp.) and Tinopal CBS-X (obtained from Ciba-Geigy Corp.). The solution was spray applied onto flat glass. The samples were heat treated using the method of Example 25. The final coating thickness was 0.9 micrometers. The samples were measured for their UV transmission before and after coating and curing. The results showed:

| Sample | % Transmission at $\lambda$ | |
|---|---|---|
| | $\lambda = 340$ nm | $\lambda = 380$ nm |
| Uncoated | 89 | 90 |
| Coated and Cured | 5 | 27 |

EXAMPLE 32

A silane mixture was prepared as follows:

One gram of Nafion 50 perfluorinated acid resin, 2 grams (0.0085 mole) of GPTMO, and 2 grams (0.11 mole) of deionized water were added together in a plastic bottle at room temperature. After 15 minutes, 91.9 grams of additional water was then added along with 3 grams (0.017 mole) of MTEO (methyltriethoxysilane) and 0.1 gram of Tritron X-102 to give 100 total grams of solution.

This formulation (at 1 hour and 20 days old) was spray applied to one-minute-line-simulated 16-oz beverage bottles at a surface temperature of 55° C. (using an AGR line-simulator). The bottles were cured at an average surface temperature of 225° C. for 30 seconds. The bottles exhibited burst pressure increases of 51 and 71% over the untreated controls respectively.

The bottles then had a 0.6 gram label (having four corners) containing 0.6 gram of adhesive applied to the surface. The adhesive was allowed to set up for 16 hours (overnight) at room temperature. The bottle exhibited a 75–80% retention (cohesive failure) of label when four (4) attempts to remove the label were made (i.e., the label was peeled by hand at every corner until a portion of the label teared off). A comparable 1 hour old formulation of 5 grams MTEO and 0.1 gram of Triton X-102, applied in the same manner on the same type of bottles, exhibited no retention of the label (adhesive failure).

EXAMPLE 33

Rectangular alumina bars were tested in 3-point bending to evaluate the ability of the present invention to strengthen it. Half of the alumina samples (n=6) were tested as controls using the Instron configured in a 3-point bend arrangement. The other half of the samples were spray-coated with 10% by weight CETMO/0.025% by weight Triton X-102/0.025 % by weight RP-40 (obtained from T. H. Goldschmidt, Germany) formulation and thermally cured using the 2-step heat treatment protocol (15 minutes at 125° C. followed by 10 minutes at 225° C.). The control samples had an average failure strength of 23,300 psi, while the treated samples had an average strength of 28,200 psi. This represents an average increase of 21%.

In view of the results reported by Hashimoto et al. in U.S. Pat. No. 4,891,241, with respect to their comparative examples 1, 2 and 3, given at col. 25, lines 27 through 29, where they found no increase in strength when only silanes were used as a coating, the degree of improvement in strength afforded by the treatment of the examples describing the present invention is quite surprising. As noted in the present specification, no additional treatment, such as described by Hashimoto et al., is used, yet the improvement in strength of the treated glass rises to two or more times that of the untreated controls, and the variability in observed strengthening is relatively small. The improvement afforded by the present invention is especially surprising in view of the teaching of Hashimoto et al. at col. 5, lines 36 et seq., where they note that the treatment of the substrate with siloxanes alone is insufficient to produce strengthening, and that a polymeric overcoat is essential for the development of the strengths reported.

Other embodiments of the invention will be apparent to those skilled in the art from consideration of the specification and practice of the invention disclosed herein. It is intended that the specification and examples to be considered as exemplary only, with a true scope and spirit of the invention being indicated by the following claims.

What is claimed:

1. A composition useful for coating a brittle oxide substrate comprising a mixture of 2-(3,4-epoxycyclohexyl) ethyltrimethoxysilane and vinyltrimethoxysilane.

2. A composition useful for coating a brittle oxide substrate comprising a mixture of 2-(3,4-epoxycyclohexyl) ethyltrimethoxysilane and methyltrimethoxysilane.

3. A composition useful for coating g brittle oxide substrate comprising a mixture of 3-glycidoxypropyltrimethoxysilane, 2-(3,4-epoxycyclohexly) ethyltrimethoxysilane, and methyltrimethoxysilane.

4. A composition useful for coating g brittle oxide substrate comprising a mixture of 3-glycidoxypropyltrimethoxysilane and 2-(3,4-epoxycyclohexyl) ethyltrimethoxysilane.

5. An aqueous-based composition useful for coating a brittle oxide substrate comprising an effective amount of 3-ureidopropryltrimethoxysilane to improve or restore strength in said brittle oxide substrate and a non-ionic surfactant.

6. An aqueous-based composition useful for coating a brittle oxide substrate comprising an effective amount of 1,2-bis(trimethoxysilyl)ethane to improve or restore strength in said brittle oxide substrate, and a non-ionic surfactant.

7. A composition useful for coating brittle oxide substrates comprising 1,2-bis(3-trimethoxysilypropoxy)ethane.

8. A composition useful for coating a brittle oxide substrate comprising a mixture of an effective amount of 3,3-dimethoxypropyltrimethoxysilane to improve or restore strength and improve humidity resistance in a brittle oxide substrate and an effective amount of 2-(3,4-epoxycyclohexyl)ethyltrimethoxysilane to improve or restore strength and labelability in said brittle oxide substrate.

9. A composition useful for coating a brittle oxide substrate comprising a mixture of a) an effective amount of 2-(3,4- epoxycyclohexyl)ethyltrimethoxysilane, 3-glycidoxypropyltrimethoxysilane, or both, to improve or restore strength and labelability to said brittle oxide substrate and b) an effective amount of vinyltrimethoxysilane, 3,3-dimethoxypropyltrimethoxysilane, methyltrimethoxysilane, or mixtures thereof, to improve or restore strength and humidity resistance in said brittle oxide substrate.

10. The composition of claim 9, wherein said mixture is 2-(3,4-epoxycyclohexyl)ethyltrimethoxysiliane and vinyltrimethoxysilane.

11. The composition of claim 9, wherein said mixture is 2-(3,4-epoxycyclohexyl)ethyltrimethoxysilane and methyltrimethoxysilane.

12. The composition of claim 9, wherein said mixture is 3-glycidoxypropyltrimethoxysilane and vinyltrimethoxysilane.

13. The composition of claim 9, wherein said mixture is 3-glycidoxypropyltrimethoxysilane and methyltrimethoxysilane.

* * * * *

UNITED STATES PATENT AND TRADEMARK OFFICE
CERTIFICATE OF CORRECTION

PATENT NO. : 5,567,235
DATED : October 22, 1996
INVENTOR(S) : Stephen W. Carson et al.

It is certified that error appears in the above-indentified patent and that said Letters Patent is hereby corrected as shown below:

In claim 3, column 18, line 51, change "g" to --a--;
  line 53, change "epoxycyclohexly" to --epoxycyclohexyl--.

In claim 4, column 18, line 55, change "g" to --a--.

In claim 5, column 18, line 58, change "aqueous-based" to --aqueous--.

In claim 6, column 18, line 63, change "aqueous-based" to --aqueous--.

In claim 7, column 19, line 2, change "trimethoxysilypropoxy" to --trimethoxysilylpropoxy--.

In claim 10, column 20, line 4, change "ethyltrimethoxysiliane" to --ethyltrimethoxysilane--; change "vinylt" to --vinyl--;
  line 5, change "rimethoxysilane" to --trimethoxysilane--.

Signed and Sealed this

Twenty-second Day of April, 1997

Attest:

BRUCE LEHMAN

*Commissioner of Patents and Trademarks*

*Attesting Officer*